(12) United States Patent
Li et al.

(10) Patent No.: US 12,724,312 B2
(45) Date of Patent: Sep. 1, 2026

(54) ELECTROCHROMIC DEVICE WITH IMPROVED CYCLING STABILITY

(71) Applicant: AMBILIGHT INC, Grand Cayman (KY)

(72) Inventors: Xuefei Li, West Lafayette, IN (US); Jianguo Mei, West Lafayette, IN (US)

(73) Assignee: Ambilight Inc., Grand Cayman (KY)

( * ) Notice: Subject to any disclaimer, the term of this patent is extended or adjusted under 35 U.S.C. 154(b) by 239 days.

(21) Appl. No.: 18/513,141

(22) Filed: Nov. 17, 2023

(65) Prior Publication Data

US 2024/0103330 A1 Mar. 28, 2024

Related U.S. Application Data

(63) Continuation of application No. PCT/US2021/043458, filed on Jul. 28, 2021.

(51) Int. Cl.
*G02F 1/1516* (2019.01)
*C09K 9/02* (2006.01)
*G02F 1/15* (2019.01)

(52) U.S. Cl.
CPC ............ *G02F 1/15165* (2019.01); *C09K 9/02* (2013.01); *C09K 2211/1416* (2013.01); *C09K 2211/1491* (2013.01); *G02F 2001/164* (2019.01)

(58) Field of Classification Search
CPC . G02F 1/15165; G02F 2001/164; C09K 9/02; C09K 2211/1416; C09K 2211/1491
See application file for complete search history.

(56) References Cited

U.S. PATENT DOCUMENTS

| | | | | |
|---|---|---|---|---|
| 2006/0012293 | A1* | 1/2006 | Warner | G02F 1/1506 548/200 |
| 2009/0052002 | A1* | 2/2009 | Xu | G01N 21/553 359/275 |
| 2013/0120821 | A1* | 5/2013 | Chandrasekhar | C07C 57/38 427/108 |
| 2019/0218338 | A1* | 7/2019 | Reynolds | C09K 11/06 |
| 2020/0387040 | A1* | 12/2020 | He | G02F 1/1524 |
| 2021/0041757 | A1 | 2/2021 | He et al. | |
| 2021/0096437 | A1 | 4/2021 | He et al. | |
| 2023/0034675 | A1* | 2/2023 | Wang | C23C 14/042 |

OTHER PUBLICATIONS

International Search Report and Written Opinion for Application No. PCT/US2021/043458, mailed on Oct. 26, 2021, 7 pages.

* cited by examiner

*Primary Examiner* — Mariam Qureshi
(74) *Attorney, Agent, or Firm* — Dickinson Wright PLLC

(57) ABSTRACT

An electrochromic device incorporating a high-energy absorbing polymer is presented to have an improved cycling stability. Various types of stable electrochromic devices are presented, including a highly stable yellow electrochromic device. Methods to improve the device cycling stability are also presented.

9 Claims, 14 Drawing Sheets

$$\eta_{eff} = E_{ox} - E_{oc}$$

$\eta_{eff}$ – Effective overpotential $E_{ox}$ – Oxidation onset potential $E_{oc}$ – Open circuit potential $$\eta_{eff} = E_{ox} - E_{oc}$$

$\eta_{eff}$ – Effective overpotential $E_{ox}$ – Oxidation onset potential $E_{oc}$ – Open circuit potential

ELECTROCHROMIC DEVICE WITH IMPROVED CYCLING STABILITY

CROSS-REFERENCE TO RELATED APPLICATIONS

This application is a continuation application of International Application No. PCT/US2021/043458, filed on Jul. 28, 2021. The content of the above application is incorporated herein by reference in its entirety.

TECHNICAL FIELD

The present disclosure is related to an electrochromic device with improved cycling stability, a highly stable yellow electrochromic device, and a method to control cycling stability of an electrochromic device.

BACKGROUND

High-energy absorbing electrochromic polymers (ECPs) are electrochromic polymers having absorbance in high-energy regions of the visible spectrum, such as yellow- or orange-colored ECPs. They are critical for various device applications, but unfortunately, they are electrochemically unstable under repetitive colored-to-transmissive switches. The lack of cycling durability for high-energy absorbing polymers is typically ascribed to high oxidation potentials required for bleaching processes. The conventional approaches to improve the cycling stability focus on decreasing the oxidation potentials via synthetic designs to stabilize high-energy absorbing ECPs. However, the synthetic approach is complicated, skill demanding and hard to be scaled up. In addition, synthetic efforts alone have not yet led to high-energy absorbing ECPs that can reversibly switch beyond thousand cycles. Therefore, alternative strategies are needed to be explored to develop electrochemically stable high-energy absorbing ECPs for an electrochromic device with improved cycling stability.

SUMMARY

The present disclosure is related to an electrochromic device comprising an electrochromic layer. The electrochromic layer comprises an electrochromic polymer having an absorbance peak within 350-500 nm or having a maximal absorbance within 350-500 nm that is at least 50% of a maximal absorbance within 400-750 nm. The electrochromic layer is configured to work under an effective overpotential of less than 1V. The disclosed electrochromic device maintains more than 95% optical contrast after more than 500 cycles.

In some embodiments, the electrochromic polymer is a high-energy absorbing electrochromic polymer comprising a propylenedioxythiophene (ProDOT) structure.

In some embodiments, the electrochromic layer is configured to work under an effective overpotential of less than 0.3 V, and the disclosed electrochromic device maintains more than 95% optical contrast after more than 1K cycles.

In some embodiments, the electrochromic polymer displays one of the following colors: yellow, orange, cyan, green, or black, or a combination thereof.

In some embodiments, the electrochromic layer comprises an electrochromic polymer with a yellow color. The electrochromic layer is configured to work under an effective overpotential of less than 0.3V, and the electrochromic device maintains more than 95% optical contrast after more than 3K cycles.

In some embodiments, the electrochromic layer comprises an electrochromic polymer with an orange color. The electrochromic layer is configured to work under an effective overpotential of less than 0.2V, and the electrochromic device maintains more than 95% optical contrast after more than 3K cycles.

This disclosure is also related to an electrochromic device comprising an electrochromic layer, which comprises an electrochromic polymer having a polyfluorene structure. The electrochromic layer is configured to work under an effective overpotential of less than 1V. The disclosed electrochromic device maintains at least 50% optical contrast after more than 100 cycles.

In another aspect, a method for improving cycling stability of an electrochromic device is also provided. And the method comprises limiting the effective overpotential for the electrochromic layer to work under 1V. The factors to limit the effective overpotential include an electrolyte material, an electrolyte concentration, and a device temperature of the electrochromic device.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings below. For the purpose of illustrating the invention, the drawings show aspects of one or more embodiments of the invention. However, it should be understood that the present invention is not limited to the precise arrangements and instrumentalities shown in the drawings. For example, in all the figures and the embodiments, the higher $\eta_{eff}$ means 0.5V or about 0.5V for 0.2M of LiTFSI/PC, and the lower $\eta_{eff}$ means 0.2V or about 0.2V for 0.4M of $LiPF_6$/PC. PC stands for propylene carbonate.

FIG. 2(A) is under the higher $\eta_{eff}$, and FIG. 2(B) is under the lower $\eta_{eff}$.

FIG. 4(A) is under the higher $\eta_{eff}$, FIG. 4(B) is under the lower $\eta_{eff}$.

FIG. 9(A) is cyclic voltammogram data of the device. FIG. 9(B) is absorbance spectra of the device at bleached and colored states. FIG. 9(C) is a diagram showing a* and b* coordinate values of the device illustrating the coloration of the device at bleached and colored states. FIG. 9(D) is a diagram showing switching kinetics of the device taken at 445 nm.

FIG. 10(A) is cyclic voltammogram data of the device. FIG. 10(B) is absorbance spectra of the device at bleached and colored states. FIG. 10(C) is a* and b* coordinate values of the device showing the coloration of the device at bleached and colored states. FIG. 10(D) is a diagram showing switching kinetics of the device taken at 490 nm.

FIG. 11(A) is cyclic voltammogram data of the thin film. FIG. 11(B) is a diagram showing switching kinetics of the thin film taken at 490 nm.

FIG. 12(A) is cyclic voltammogram data of the thin film. FIG. 12(B) is a diagram showing switching kinetics of the thin film taken at 550 nm.

FIG. 13(A) is cyclic voltammogram data of the thin film. FIG. 13(B) is a diagram showing switching kinetics of the thin film taken at 390 nm.

DETAILED DESCRIPTION OF EMBODIMENTS

Figures 1, 2A:
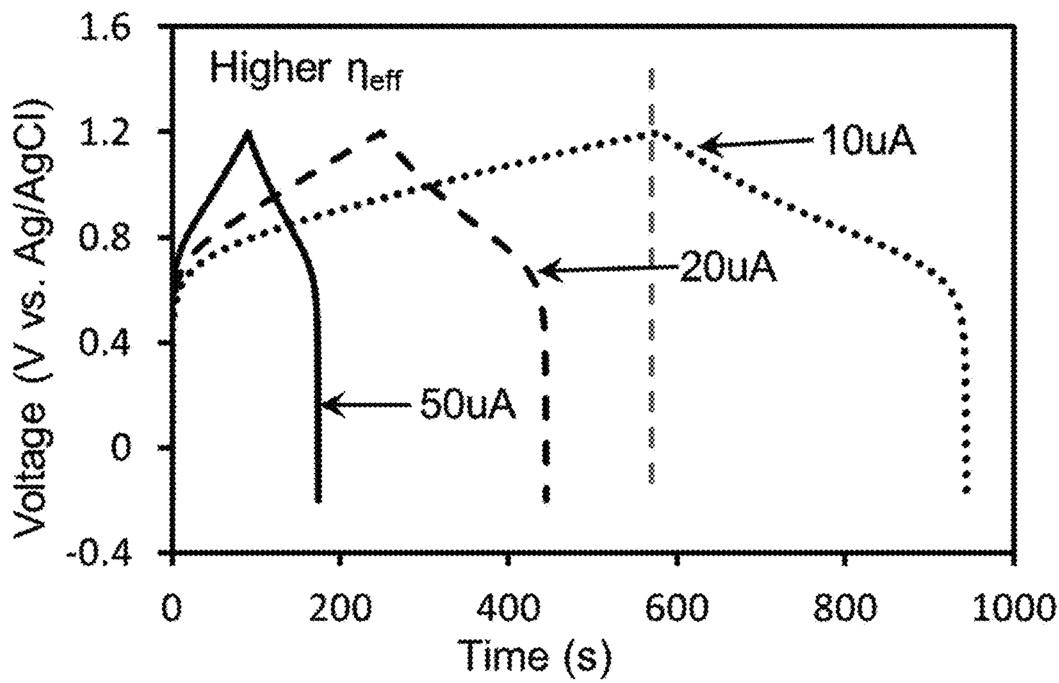
FIG. 1 is an equation illustrating the relationship between effective overpotential $\eta_{eff}$, oxidation onset potential $E_{ox}$, and open circuit potential $E_{oc}$.
FIGS. 2(A)-(B) are diagrams showing the charge-discharge curves for an ECP-yellow thin film under different effective overpotentials (gay).

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it was individually recited herein. Additionally, the singular forms "a" "an", and "the" include plural referents unless the context clearly dictates otherwise.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment, but maybe in some instances. Furthermore, the particular features, structures, or characteristics may be combined in any suitable manner in one or more embodiments.

Three specific electrochromic polymers are used throughout this specification for example purposes. It is to be understood that the general inventive concept can be extracted from these examples, and that the specific examples do not limit the scope of this disclosure. ECP-yellow is a yellow-colored ECP with Formula 1. ECP-orange is an orange-colored ECP with Formula 2. ECP-black is a black-colored ECP with Formula 3. Polyfluorene is a fluorescent electrochromic (EC) material with Formula 4. All the formulas are listed below.

Formula 1

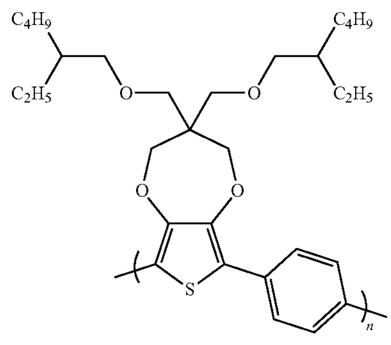

Formula 2

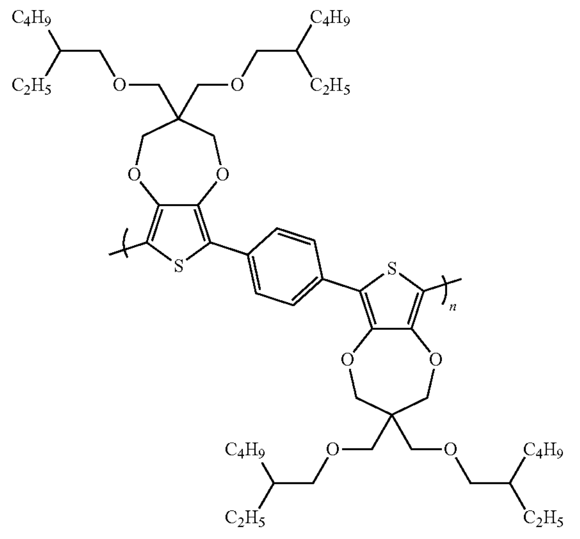

-continued

Formula 3

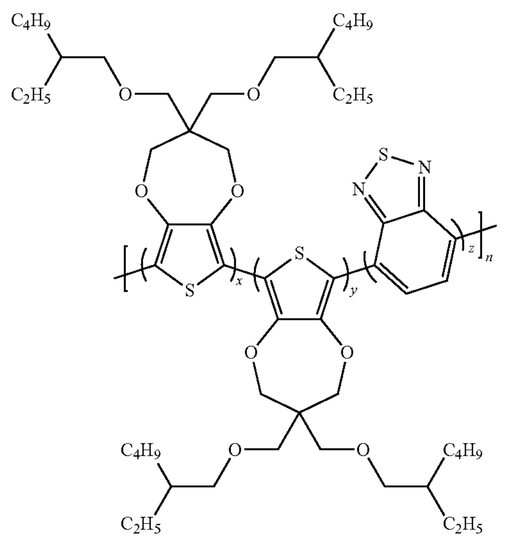

x = 0.65 y = 1.0 z = 0.35

Formula 4

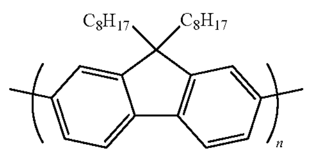

The present disclosure is related to an electrochromic device (ECD) comprising an electrochromic layer. The electrochromic layer comprises an electrochromic polymer (ECP) either having an absorbance peak within 350-500 nm or having a maximal absorbance within 350-500 nm that is at least 50% of a maximal absorbance within 400-750 nm. The electrochromic layer in configured to work under an effective overpotential of less than 1V. The disclosed electrochromic device maintains more than 95% optical contrast after more than 500 cycles.

The lack of cycling durability for high-energy absorbing ECPs is typically ascribed to a high oxidation potential required for a bleaching process (i.e., oxidation process). Conventional approaches to improve cycling stability of a high-energy absorbing ECP focus on lowering its oxidation potential via a molecular design. The present disclosure, for the first time, demonstrates that in some embodiments, a high-energy absorbing ECP can be electrochemically stabilized by simply limiting the effective overpotential with or without any molecular modification.

An effective overpotential ($\eta_{eff}$) describes an oxidative bias away from equilibrium. It represents the activation energy barrier required to oxidize a polymer and may better explain the thermodynamics and kinetics of an ECP's oxidation process than the conventional factor of ECP's oxidation onset potential ($E_{ox}$) alone. $\eta_{eff}$ is determined as the difference between ECP's oxidation onset potential ($E_{ox}$) and open circuit potential ($E_{oc}$), as shown in FIG. 1.

$E_{ox}$ is an oxidation onset potential to start ECP's oxidation reaction which can be experimentally observed and is highly related to ECP's structure and can be extracted from electrochemical voltammograms. Open circuit potential $E_{oc}$ is a result of potential difference built up at the polymer-electrolyte surface when no external bias is applied to the system, and it can be measured between the working and reference electrodes when no current passes through the system.

A stable low-energy absorbing ECP typically has a low $E_{ox}$. Thus, its resulting $\eta_{eff}$ is usually small. However, a high-energy absorbing ECP usually has a high $E_{ox}$, therefore, when $E_{oc}$ is low, $\eta_{eff}$ is high, and it becomes challenging to stabilize the ECP. As rationalized through the equation in FIG. 1, for an ECP, $E_{ox}$ is more or less fixed when the polymer structure is fixed, but by increasing $E_{oc}$, $\eta_{eff}$ can be decreased. The decreased $\eta_{eff}$ theoretically makes the oxidation of ECPs more feasible and highly reversible, also speeds up the oxidation reaction kinetics, and reduces the deterioration of electrochemical and electrochromic properties of ECPs during cycling. Thus, the decreased $\eta_{eff}$ improves cycling stability.

To demonstrates that lowering $\eta_{eff}$ indeed improves a polymer's cycling stability, various characterizations are performed, including electrochemical, mass change and electrochromic characterizations for two different electrolyte conditions, i.e., 0.2M of LiTFSI in PC (LiTFSI/PC) and 0.4M of $LiPF_6$ in PC ($LiPF_6$/PC). An ECP-yellow thin film with a thickness of about 140 nm is deposited on ITO/glass substrate and tested in a three-electrode system with Pt wire as the counter electrode, and Ag/AgCl as the reference electrode. In these three-electrode systems, $\eta_{eff}$ is 0.5V or about 0.5V for 0.2M of LiTFSI/PC (referred to as the higher $\eta_{eff}$ in the figures and the embodiments) while it is 0.2V or about 0.2V for 0.4M of $LiPF_6$/PC (referred to as the lower $\eta_{eff}$ in the figures and the embodiments). The specific effective overpotential values here are representative values to illustrate a higher and a lower effective overpotentials for the example ECP-yellow thin film, the absolute values may not be applicable to other ECPs.

Figure 2B:
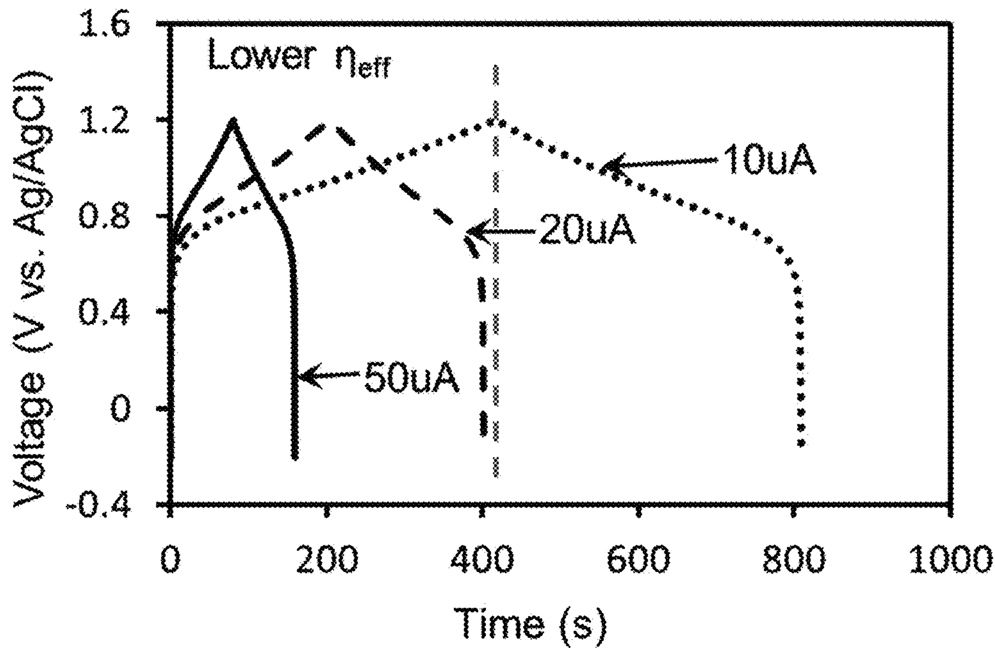
Figure 3:
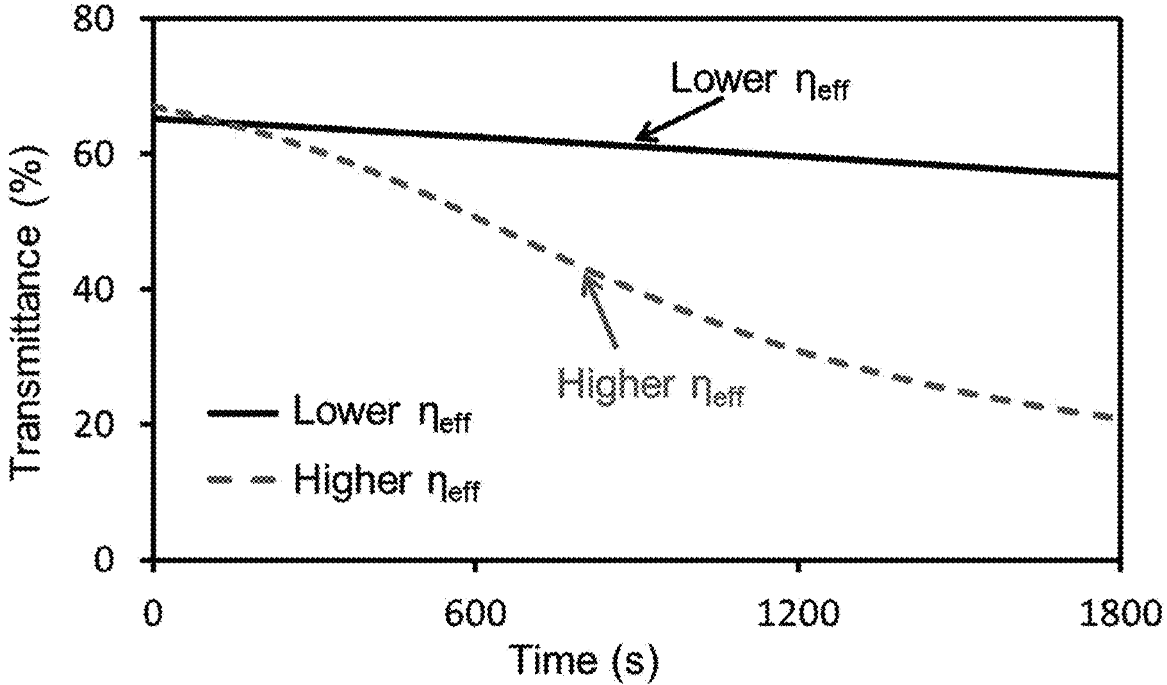
FIG. 3 is a diagram showing the transmittance changes of a bleached ECP-yellow thin film during self-coloration under open circuit conditions for 30 minutes at 445 nm, under the higher $\eta_{eff}$ and the lower $\eta_{eff}$, respectively.

Higher $\eta_{eff}$ means higher activation energy barrier and thus creates more challenges to oxidize a polymer. This can be indicated by charge-discharge kinetics and self-coloration kinetics under different $\eta_{eff}$ conditions. As shown in FIGS. 2(A)-(B), during the charging and discharging experiments, constant currents of 10 μA, 20 μA, and 50 μA are applied. The working electrode potential increases slower under the higher $\eta_{eff}$ than that under the lower $\eta_{eff}$. Therefore, it leads to asymmetric charge-discharge kinetics that is particularly prominent at a smaller current of 10 μA. The asymmetry in charge and discharge profile indicates that oxidation is more challenging at the higher $\eta_{eff}$ condition. In addition, the self-coloration of bleached films at open circuit conditions also indicates the electrochemical instability of the thin film at a bleached state (i.e., oxidized state). After the polymer is oxidized, if its oxidized form is not stable, the polymer intends to return back to its neutral state and self colored. As shown in FIG. 3, the transmittance of bleached thin films under both $\eta_{eff}$ conditions are monitored under open circuit conditions for 30 minutes. Under the higher $\eta_{eff}$ condition, the transmittance drops significantly from 70% to 20%, while it drops insignificantly (less than 10%) under the lower $\eta_{eff}$ condition. This indicates that the oxidized thin film is less stable when working under the higher $\eta_{eff}$. So when $\eta_{eff}$ is higher, it is more challenging to oxidize the polymer, and the oxidized form is also less stable and more prone to get back to the neutral state. On the contrary, lowering $\eta_{eff}$ makes the polymer oxidation easier and the oxidized form is more stable.

Figure 4A:
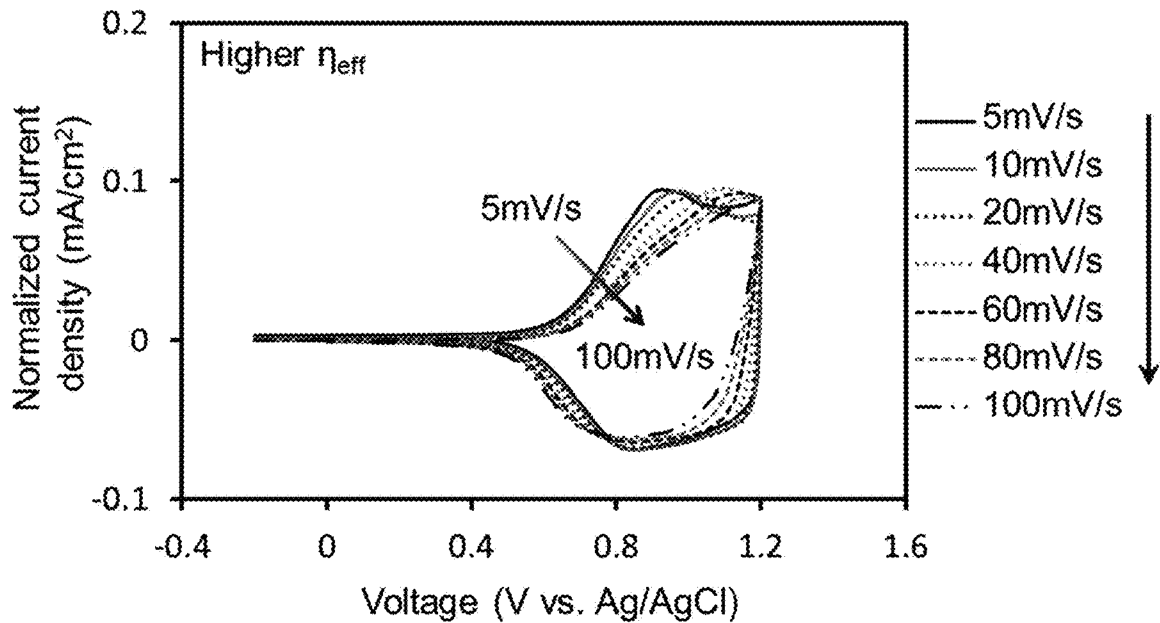
FIGS. 4(A)-(B) are cyclic voltammogram data of an ECP-yellow thin film in a three-electrodes system under different $\eta_{eff}$ with the scan rates changing from 5 mV/s to 100 mV/s.
Figure 4B:
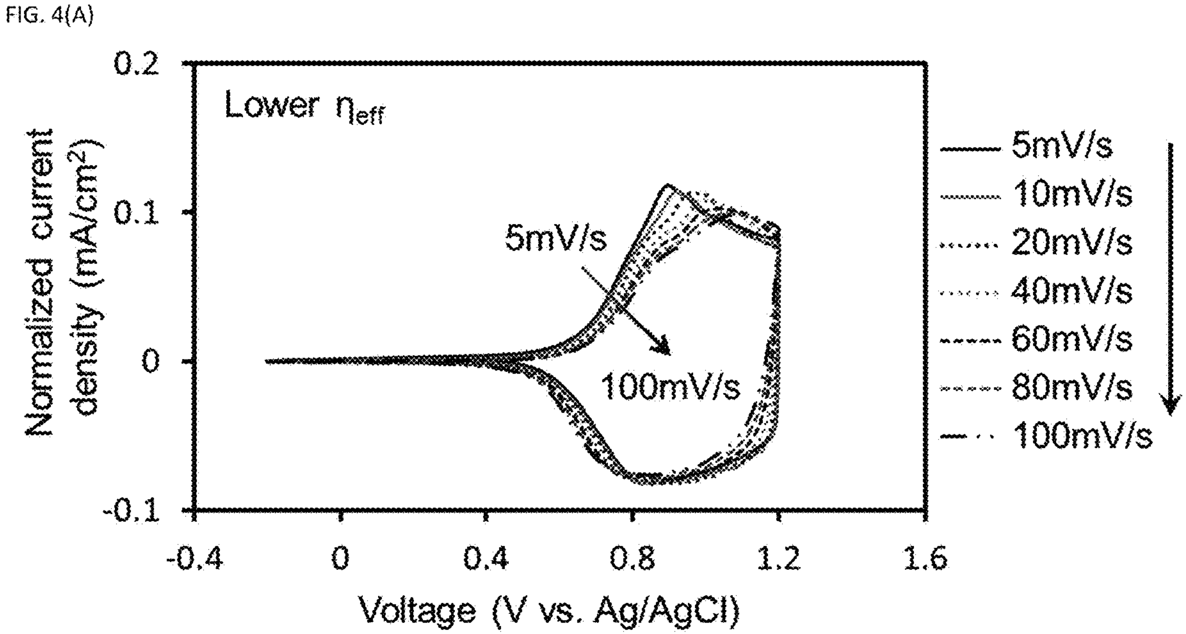

More challenging oxidation processes under higher $\eta_{eff}$ conditions lead to obviously more asymmetric electrochemical responses. The more reversible of the redox process is, the higher symmetry we can get on the voltammogram. As shown in FIG. 4(A), under the higher $\eta_{eff}$, the cathodic and the anodic portion of the cyclic voltammogram is more asymmetric, with higher hysteresis between the oxidation and reduction voltages. As the scan rate increases, the asymmetry in the voltammogram becomes more prominent. On the contrary, under the lower $\eta_{eff}$ in FIG. 4(B), the voltammogram is more symmetric across the x-axis, and symmetry persists better at increasing scan rates. Thus, a lower $\eta_{eff}$ leads to a more symmetric voltammogram and better reversibility of the oxidation process.

Figure 5:
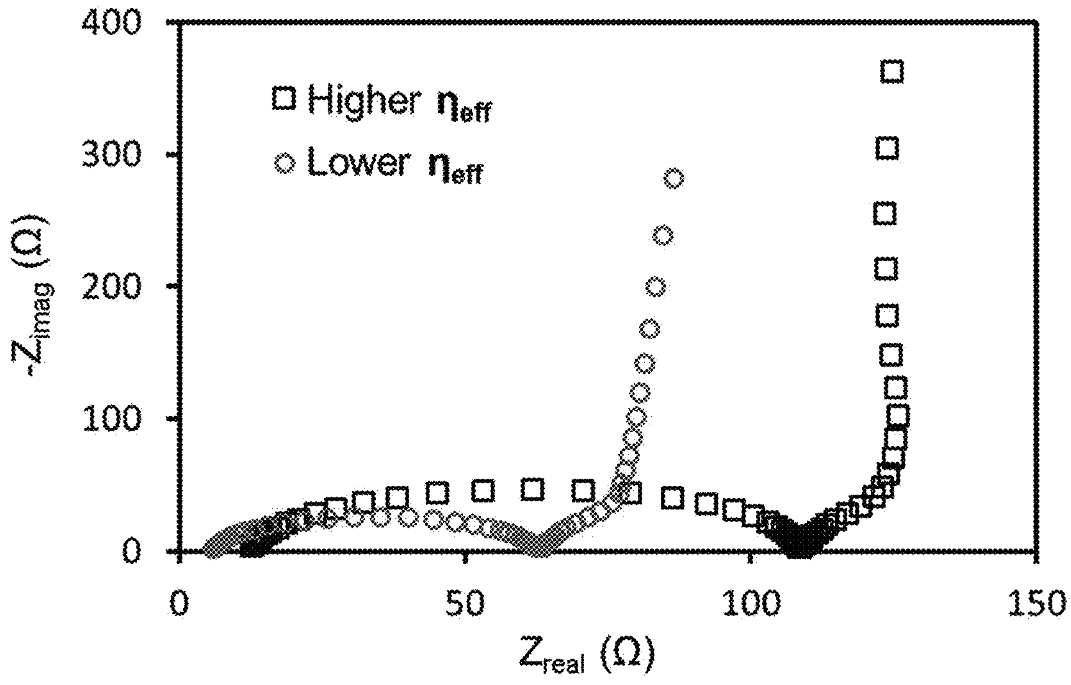
FIG. 5 is a diagram showing the impedance of an ECP-yellow thin film in a bleached state at 1.2V vs. Ag/AgCl, under the higher $\eta_{eff}$ and the lower $\eta_{eff}$, respectively.
Figure 6:
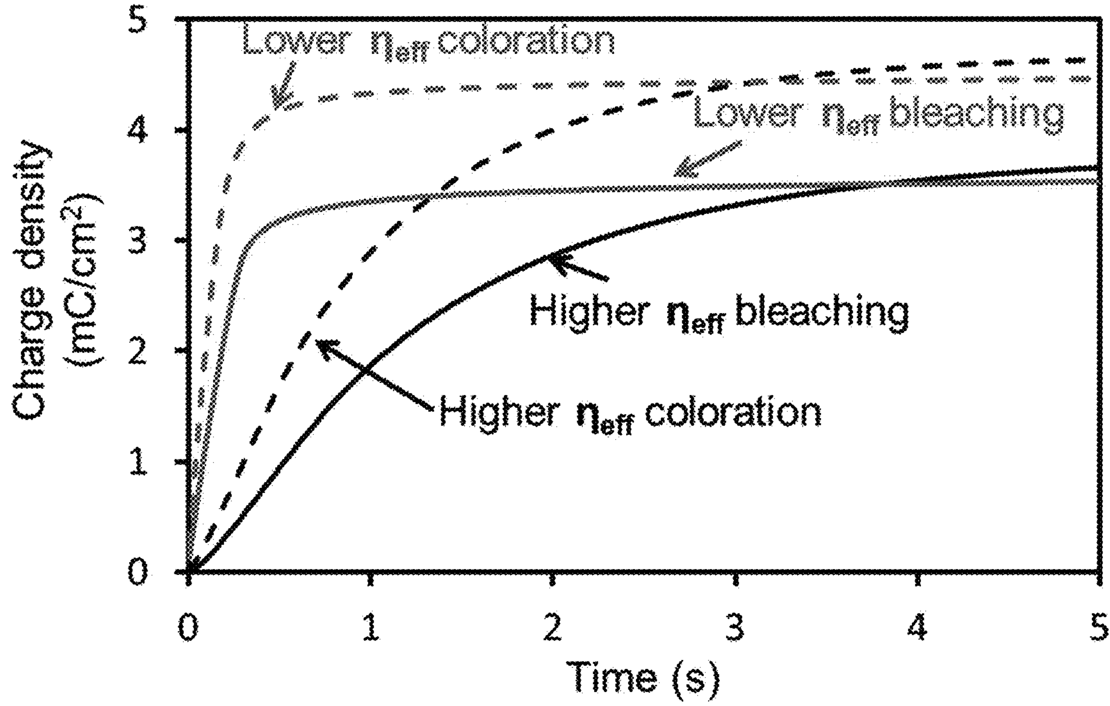
FIG. 6 is a diagram showing the charge density changes of an ECP-yellow thin film during bleaching (solid lines) and coloration (dashed lines) processes, under the higher $\eta_{eff}$ and the lower $\eta_{eff}$, respectively.

The greater loss of voltammogram symmetry under a higher $\eta_{eff}$ condition is a result of a more sluggish oxidation reaction and slower charge transfer kinetics. The charge transfer kinetics is studied by AC impedance measurement. As shown in FIG. 5, the charge transfer resistance $R_{CT}$ under the higher $\eta_{eff}$ is larger than that under the lower $\eta_{eff}$ condition. This can be also reflected on slower charge transfer kinetics (as shown in FIG. 6), which leads to slower speeds of charge density accumulation under step voltages. On the contrary, under a lower $\eta_{eff}$ conditions, faster charge transfer kinetics are observed during both bleaching and coloration processes.

Figure 7A:
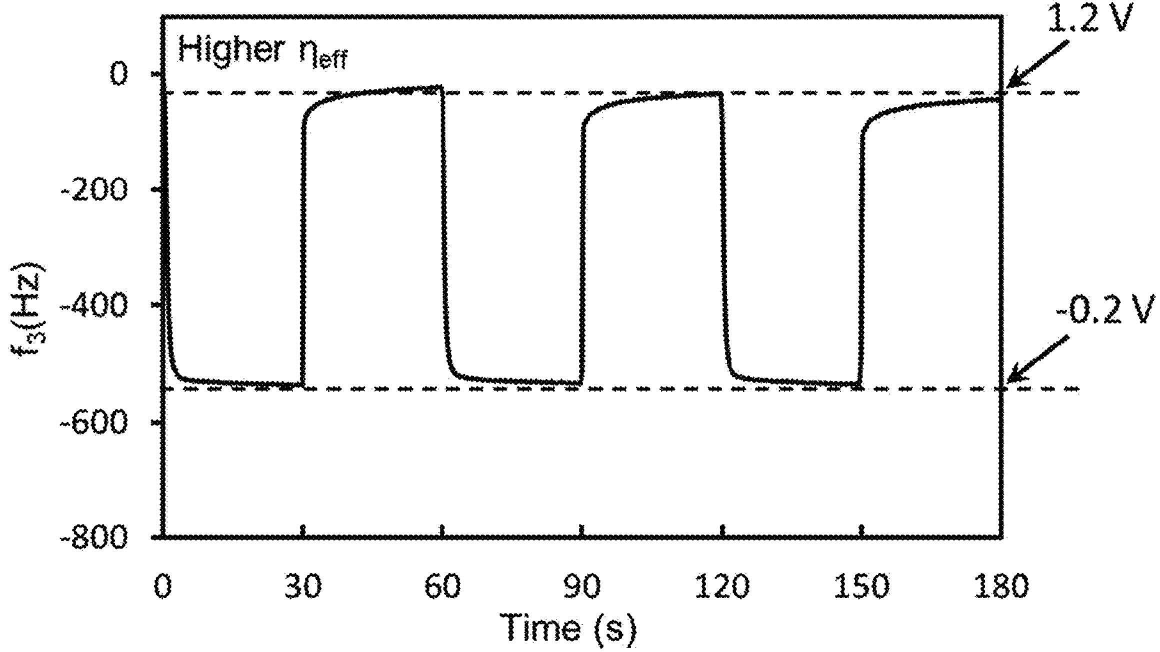
FIGS. 7(A)-(B) are diagrams showing the frequency ($f_3$) responses of the third overtone from electrochemical quartz crystal microbalance (EQCM)-D of an ECP-yellow thin film at alternating oxidative and reduction step voltages, under the higher $\eta_{eff}$ (shown in FIG. 7(A)) and the lower $\eta_{eff}$ (shown in FIG. 7(B)).
Figure 7B:
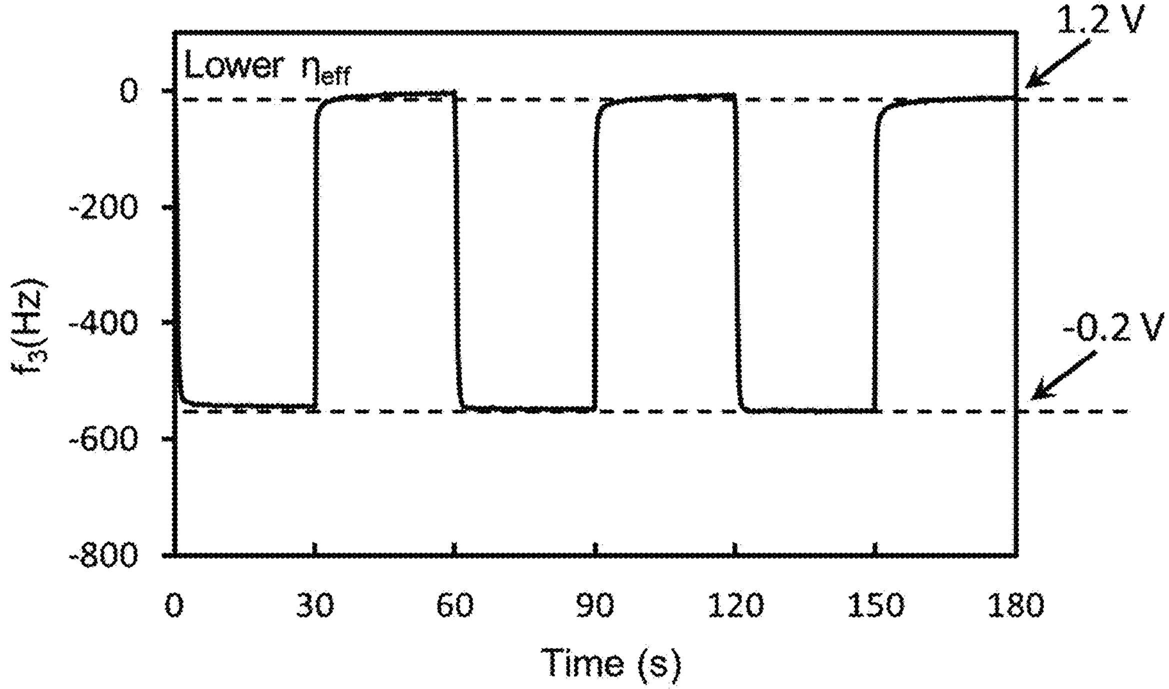

The faster switching kinetics at a lower $\eta_{eff}$ is also demonstrated by in-situ mass change kinetics. During the electrochemical bleaching process, ions and solvents enter the polymer matrix and induce an increase in total polymer mass and thus a decrease in resonant frequency. In the reverse process (i.e., coloration process), ions and solvent exit the polymer matrix. The associated mass changes, represented by changes in resonant frequency, are measured in situ by electrochemical quartz crystal microbalance (EQCM). As shown in FIGS. 7(A)-(B), although the changes in resonant frequency $f_3$ are in a same magnitude, within the first few seconds in the bleaching process from −0.2 V to 1.2 V, the change in $f_3$ under the lower $\eta_{eff}$ condition is faster than that in the higher $\eta_{eff}$ condition. Thus, faster mass change kinetics, representing better reversibility can be achieved by lowering $\eta_{eff}$ condition.

Figure 8A:
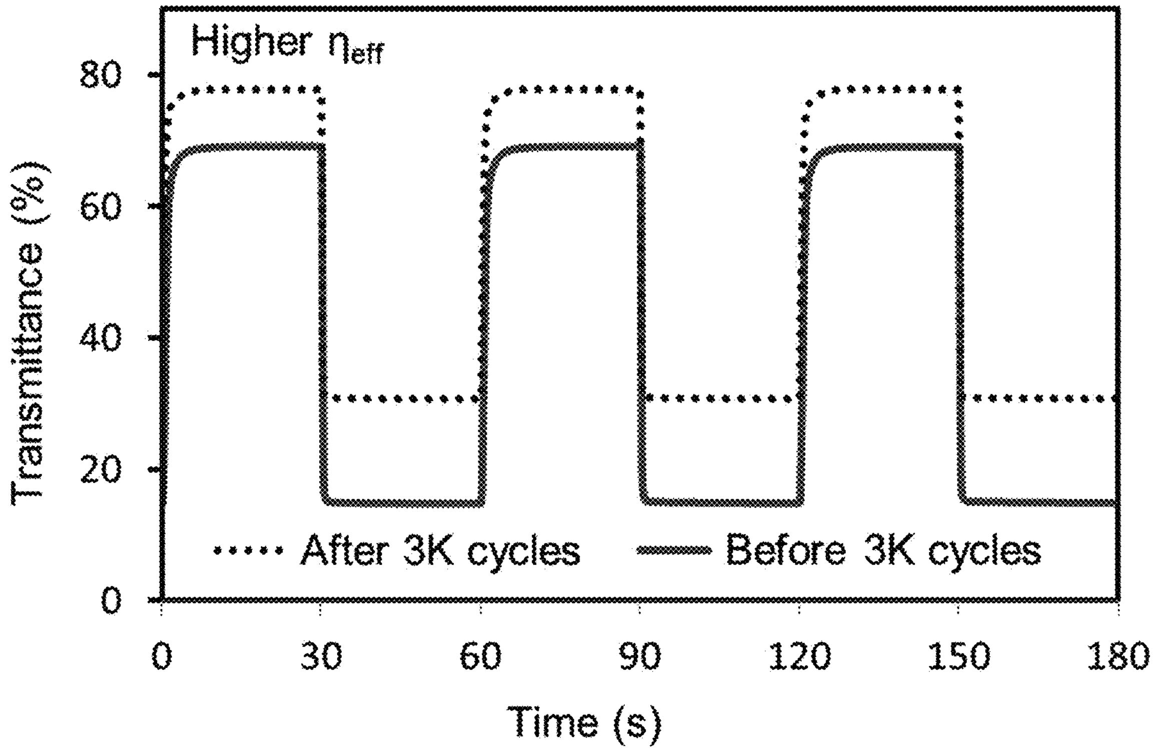
FIGS. 8(A)-(B) are diagrams showing in-situ transmittance responses of an ECP-yellow thin film at alternating oxidative and reduction step voltages at 445 nm, under the higher $\eta_{eff}$ (shown in FIG. 8(A)) and the lower $\eta_{eff}$ (shown in FIG. 8(B)).
Figure 8B:
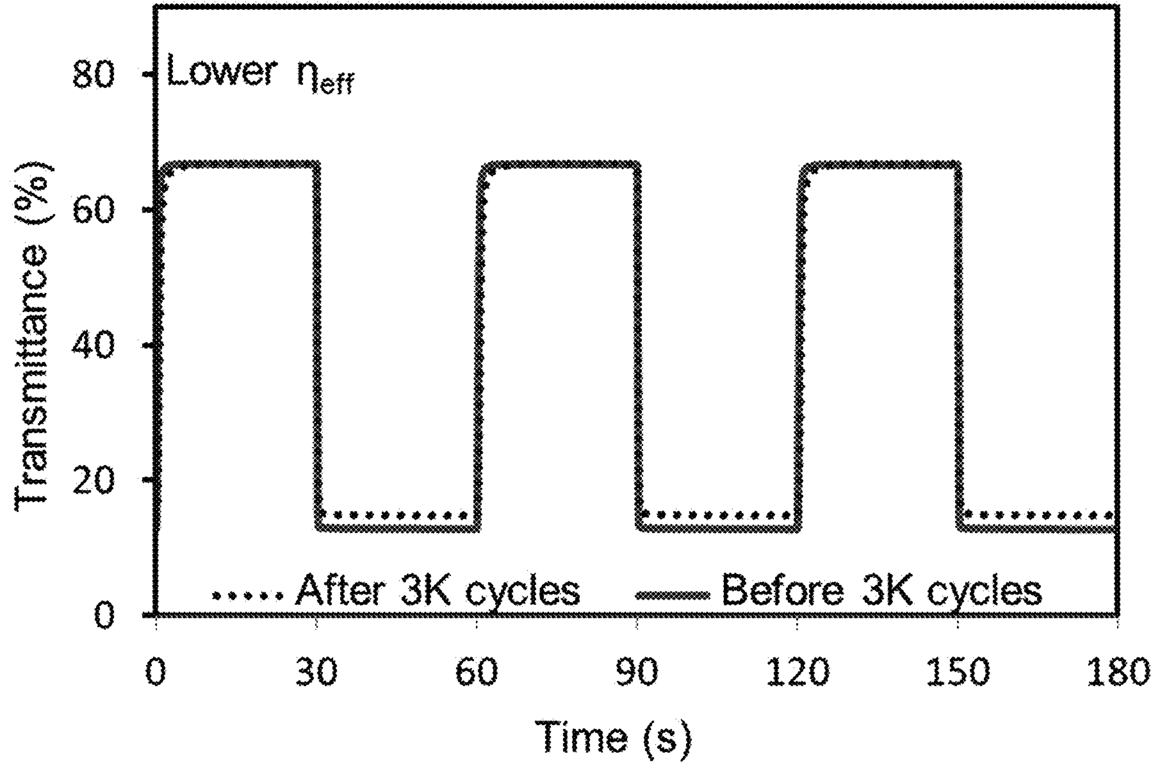
Figure 9A:
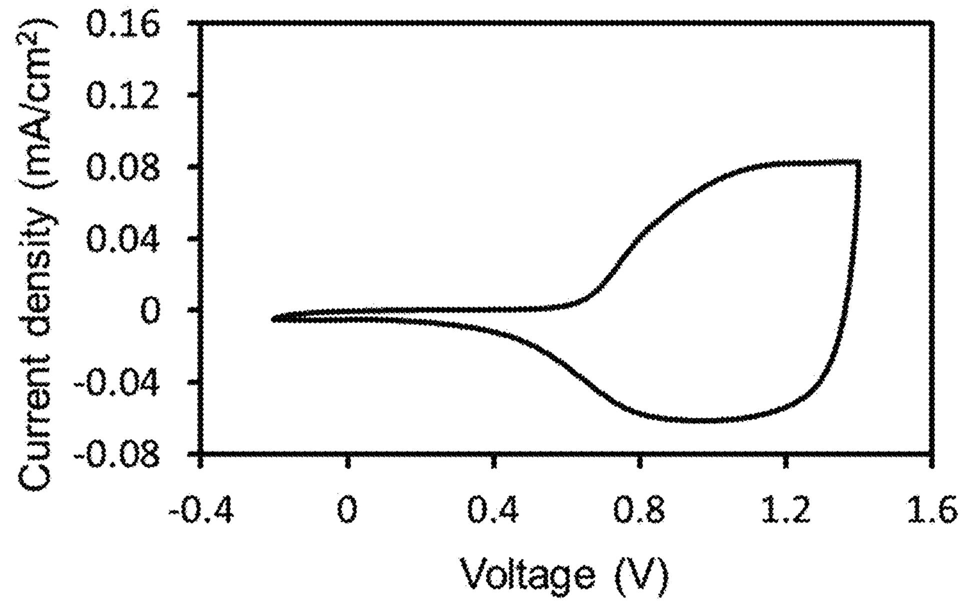
FIGS. 9(A)-(D) contain electrochemical and spectroelectrochemical data of an example solid-state electrochromic device comprising ECP-yellow before (solid lines) and after (dashed lines) 20K cycles.
Figure 9B:
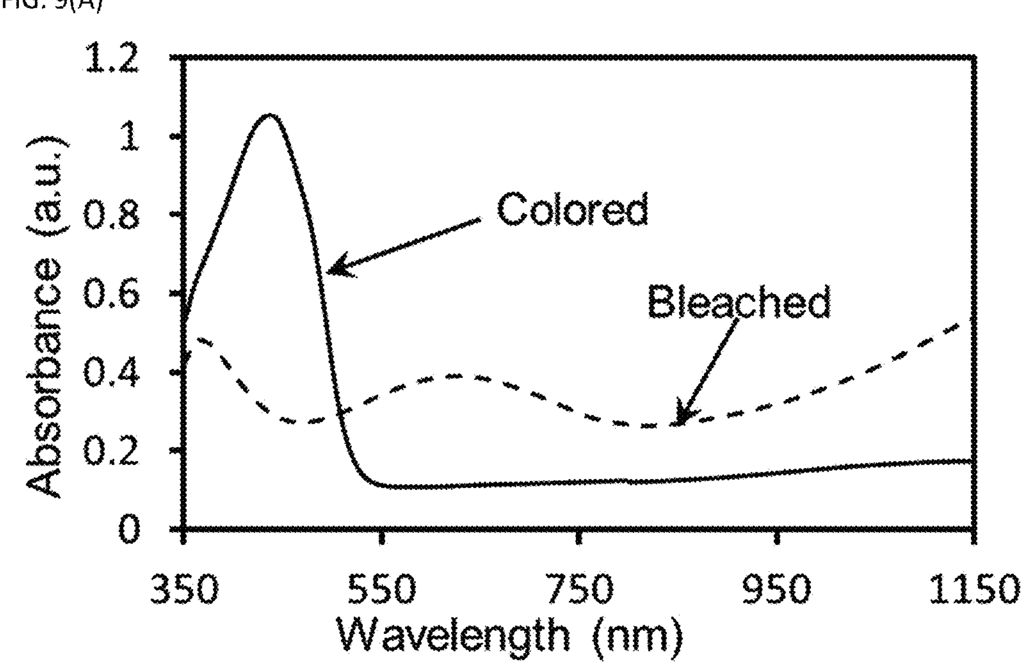
Figure 9C:
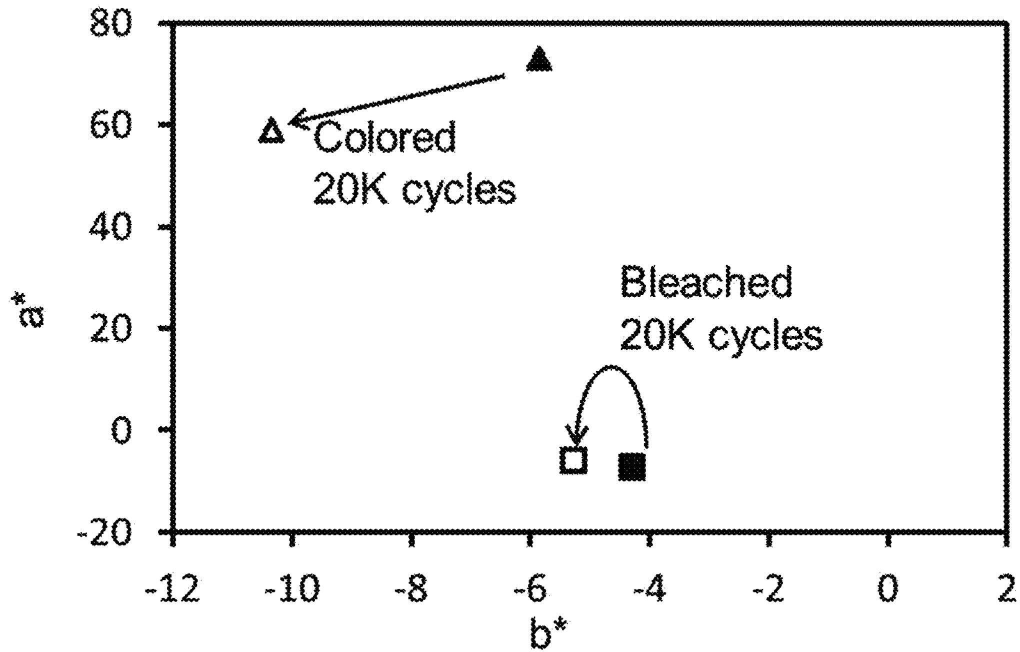
Figure 9D:
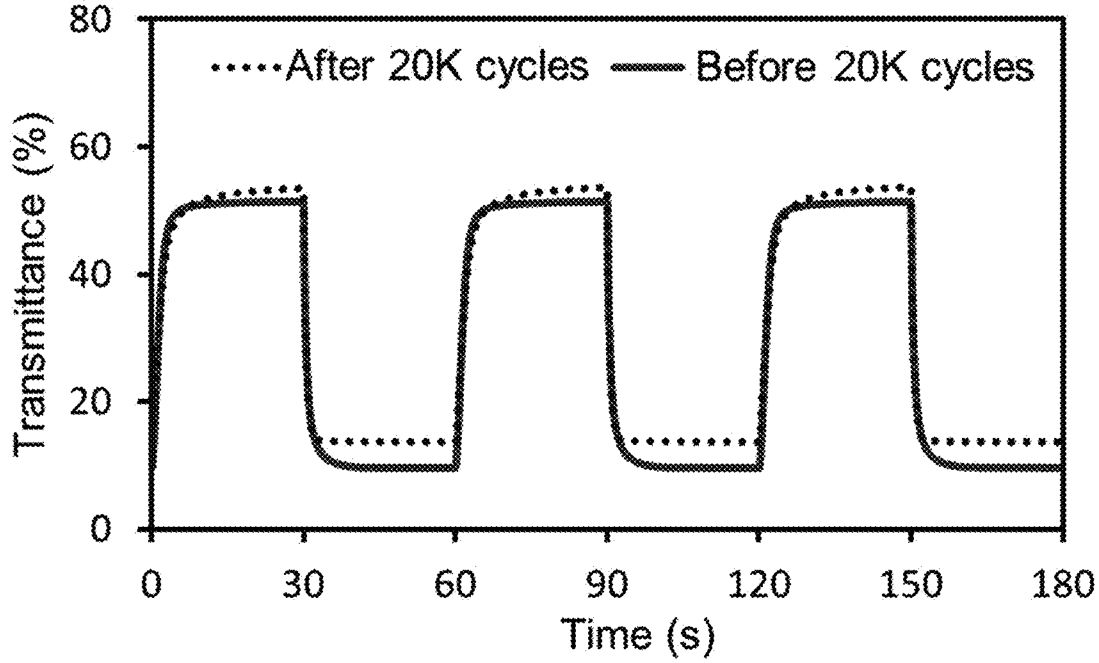
Figure 10A:
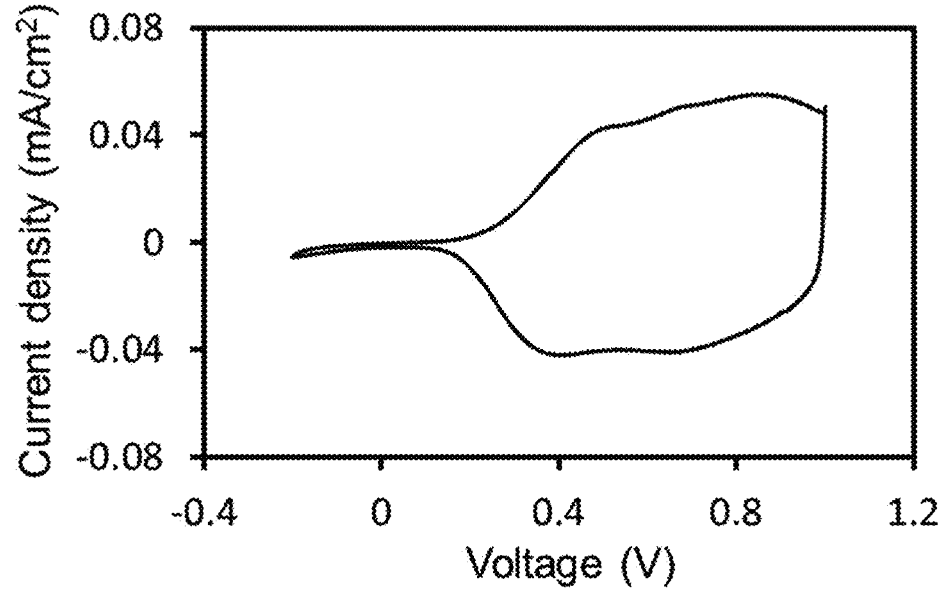
FIGS. 10(A)-(D) contain electrochemical and spectroelectrochemical data of an example solid-state electrochromic device comprising ECP-orange before (solid lines) and after (dashed lines) 20K cycles.
Figure 10B:
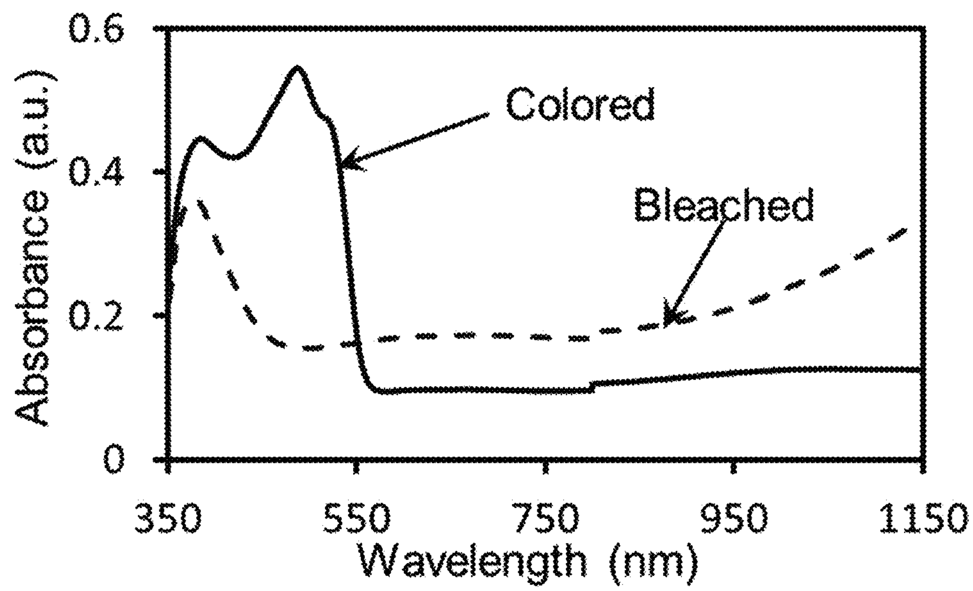
Figure 10C:
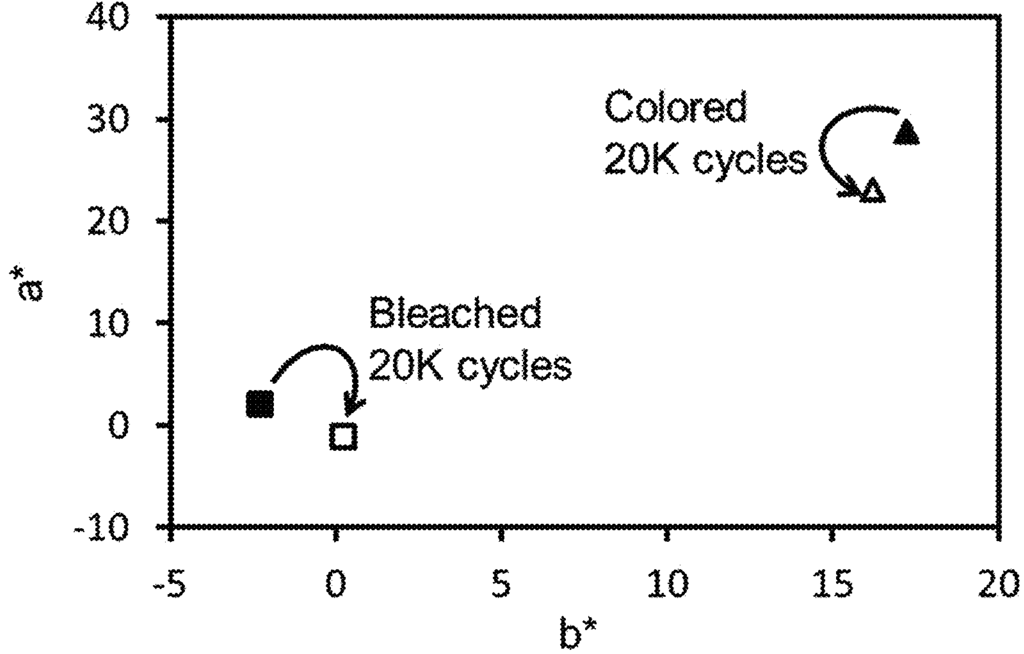
Figure 10D:
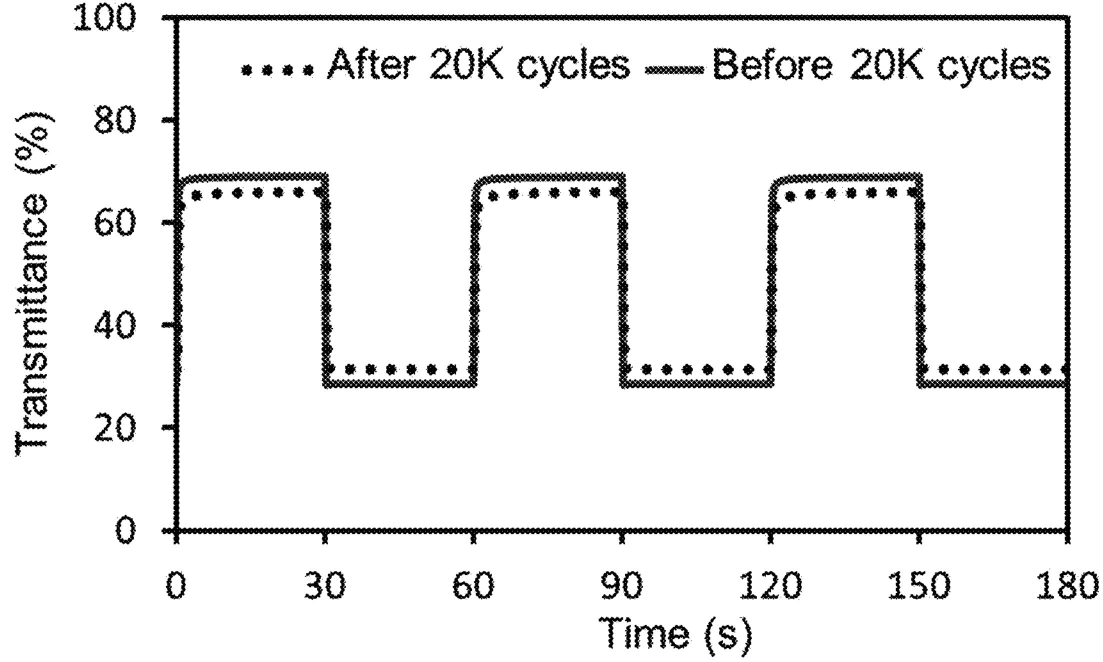

The improved cycling stability with a lower $\eta_{eff}$ is demonstrated by electrochromic characterization. The optical transition is monitored as step voltages are applied between 1.2 V and −0.2V. As shown in FIGS. 8(A)-(B), the optical transmittance at $\lambda_{max}$=445 nm is monitored in situ. The optical contrasts under both $\eta_{eff}$ conditions are similar before 3K cycles, at a value of 55%. However, after 3K cycles, the optical contrasts under the higher $\eta_{eff}$ condition decrease to 45% while that under the lower $\eta_{eff}$ condition remains the same. Thus, lowering $\eta_{eff}$, optical contrast is better reversed, indicating a better cycling stability. In addition, as shown in FIGS. 8(A)-(B), a faster switching kinetics for a bleaching process under the lower $\eta_{eff}$ condition is also observed.

By establishing a low $\eta_{eff}$ for a high-energy absorbing ECP, an ECD incorporating the high-energy absorbing ECP can be set up to have a significantly improved cycling stability. In some embodiments, the high-energy absorbing ECP is a single-band absorbing ECP with a maximal absorbance peak within 350-500 nm, for example, yellow-colored ECPs, orange-colored ECPs. In some embodiments, the high-energy absorbing ECP is a multiple-band absorbing ECP having at least one absorbing band within 350-500 nm, for example, green-colored ECPs, cyan-colored ECPs. In some embodiments, the high-energy absorbing ECP has a broad absorption with a maximal absorbance within 350-500 nm at least 50% of the maximal absorbance within 400-750 nm, for example, black-colored ECPs, grey-colored ECPs. In some embodiments, the high-energy absorbing ECP is a blending of ECPs with a maximal absorbance within 350-500 nm at least 50% of the maximal absorbance within 400-750 nm, for example, a polymer mixture blended from a cyan-colored ECP, a yellow-colored ECP, and a magenta-colored ECP.

In some embodiments, the electrochromic polymer is a high-energy absorbing electrochromic polymer comprising a propylenedioxythiophene (ProDOT) structure unit.

In some embodiments, the electrochromic layer in configured to work under an effective overpotential of less than 0.3 V, and the disclosed electrochromic device maintains more than 95% optical contrast after more than 1K cycles.

In some embodiments, the high-energy absorbing electrochromic polymer in the disclosed electrochromic layer displays one of the following colors: yellow, orange, cyan, green or black, or a combination of some of those colors. In some embodiments, the high-energy absorbing electrochromic polymer in the disclosed electrochromic layer includes one or more of ECP-yellow, ECP-orange, ECP-cyan, ECP-green, and ECP-black.

In some embodiments, the electrochromic layer in the disclosed device comprises an electrochromic polymer with a yellow color. The yellow electrochromic layer in configured to work under an effective overpotential of less than 0.3V. The electrochromic device maintains more than 95% optical contrast after more than 3K cycles. In one embodiment, a highly stable solid-state yellow ECD is configured with ECP-yellow used in the electrochromic layer, 1M of $LiPF_6$ in PEGMEA as the electrolyte and a $Li^+$ doped vanadium oxide thin film as the ion storage layer. The ECP-yellow layer is configured to work under an $\eta_{eff}$ of 0.2V, and the optical contrast of the ECP-yellow layer at 445 nm slightly dropped from ~42% to ~40% even after 20K full-contrast cycles. FIGS. 9(A)-(D) show the electrochemical and optical performances of the example device. By switching between 1.4V and −0.2V, the device color switches between vibrant yellow color and transparent. The cycling stability of this yellow device is unprecedented for ECDs displaying yellow color to the best of our knowledge.

Figure 11A:
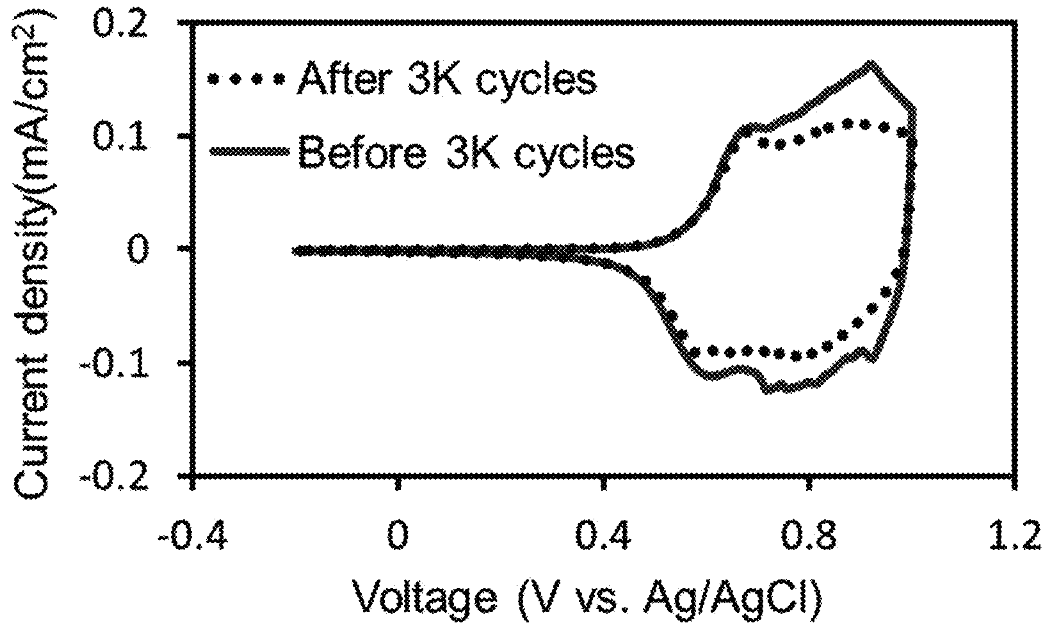
FIGS. 11(A)-(B) contain optical and electrochemical data of a three-electrode system with an ECP-orange layer before (solid lines) and after (dash lines) 3K cycles.
Figure 11B:
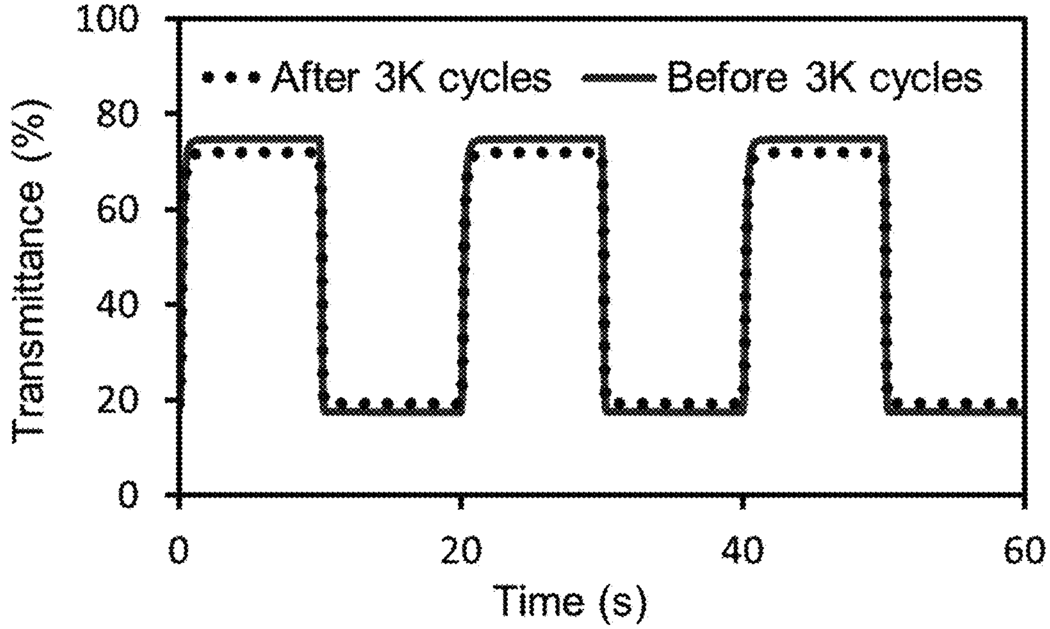

In some embodiments, the electrochromic layer in the disclosed device comprises an electrochromic polymer with an orange color. The electrochromic layer in configured to work under an effective overpotential of less than 0.2V, and the electrochromic device maintains more than 95% optical contrast after more than 3K cycles. In one embodiment, a stable solid-state orange ECD is configured with ECP-orange used in the electrochromic layer, 1M of $LiPF_6$ in PEGMEA as the electrolyte and $Li^+$ doped vanadium oxide thin film as the ion storage layer. The electrochromic layer in configured to work under an $\eta_{eff}$ of 0V, and the optical contrast of the electrochromic layer at 490 nm only slightly dropped from 40% to −36% even after 20K full-contrast cycles. FIGS. 10(A)-(D) show the electrochemical and optical performances of the example device. By switching between 1.0V and −0.2V, the device color switches between orange color and transparent. The cycling stability of this device is unprecedented for ECDs displaying orange colors to the best of our knowledge. In another embodiment, a three-electrode system with an electrochromic layer comprising ECP-orange is constructed. 1M $LiPF_6$/PC is used as electrolyte, Pt wire is used as counter electrode and Ag/AgCl is used as reference electrode. The electrochromic layer in configured to work under a $\eta_{eff}$ of 0 V, and ECP-orange layer maintains more than 95% optical contrast after 3K cycles in the three-electrode system, as shown in FIGS. 11(A)-(B). In the embodiments above, the cycling stability in the three-electrode system is not as good as the one from the corresponding solid state device. That is because of the contact with water and oxygen, concentrated electrolyte in the three-electrode system goes through degradation, thus limiting the cycling stability of an electrochromic layer in a three-electrode system.

The same working principle can be extended to other conventionally unstable high-energy absorbing ECPs, including ECP-black and a blue OLED material polyfluorene, to improve their cycling stability.

Figure 12A:
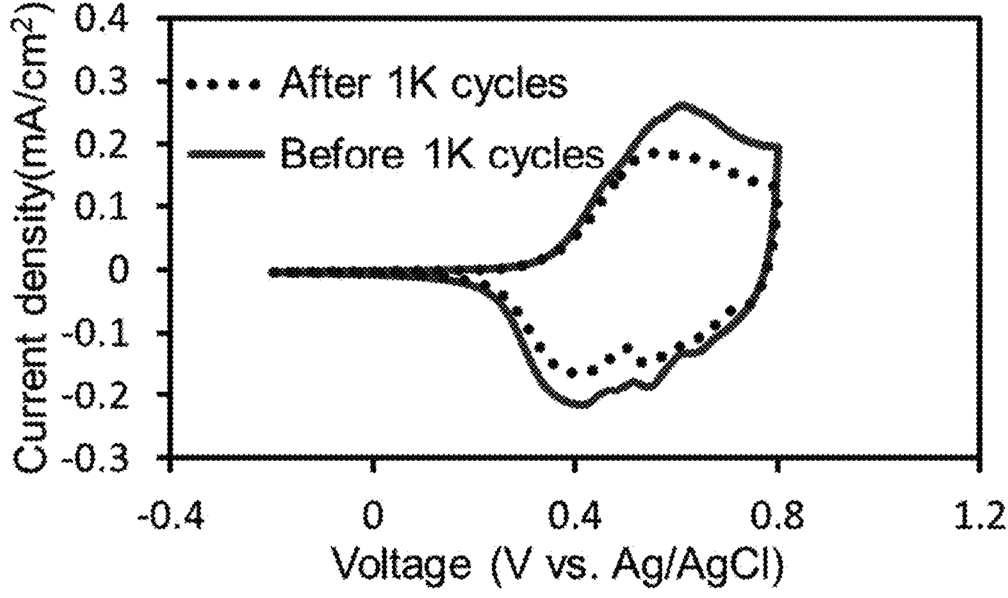
FIGS. 12(A)-(B) contain optical and electrochemical data of a three-electrode system with an ECP-black layer before (solid lines) and after (dash lines) 1K cycles.
Figure 12B:
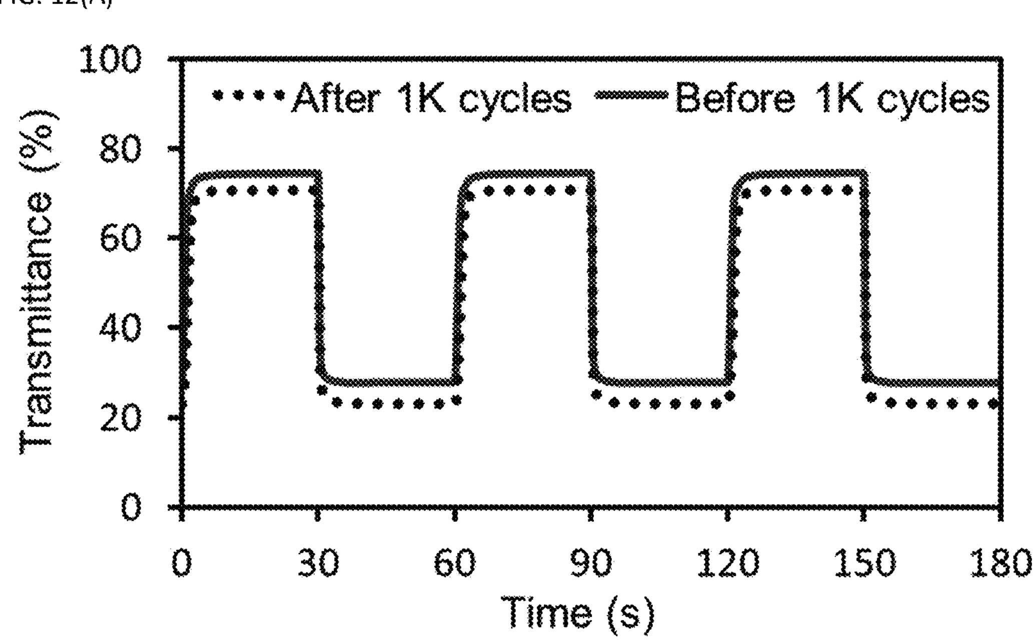

In one embodiment, a three-electrode system with an electrochromic layer comprising ECP-black is constructed. 1M $LiPF_6$/PC is used as electrolyte, Pt wire is used as counter electrode and Ag/AgCl is used as reference electrode. FIGS. 12(A)-(B) show the electrochemical and optical performances of the example device. The ECP-black layer is configured to work under an $\eta_{eff}$ of 0V. By switching between 0.8V and −0.2V, the color of the ECP-black layer switches between black color and transparent. The optical contrast of the ECP-black layer at 550 nm only slightly dropped from 49% to −47% even after 1K full-contrast cycles in the three-electrode system. Black color is a broad absorbing color, but only 550 nm is selected for monitoring because it is the most sensible wavelength to human eyes.

Figure 13A:
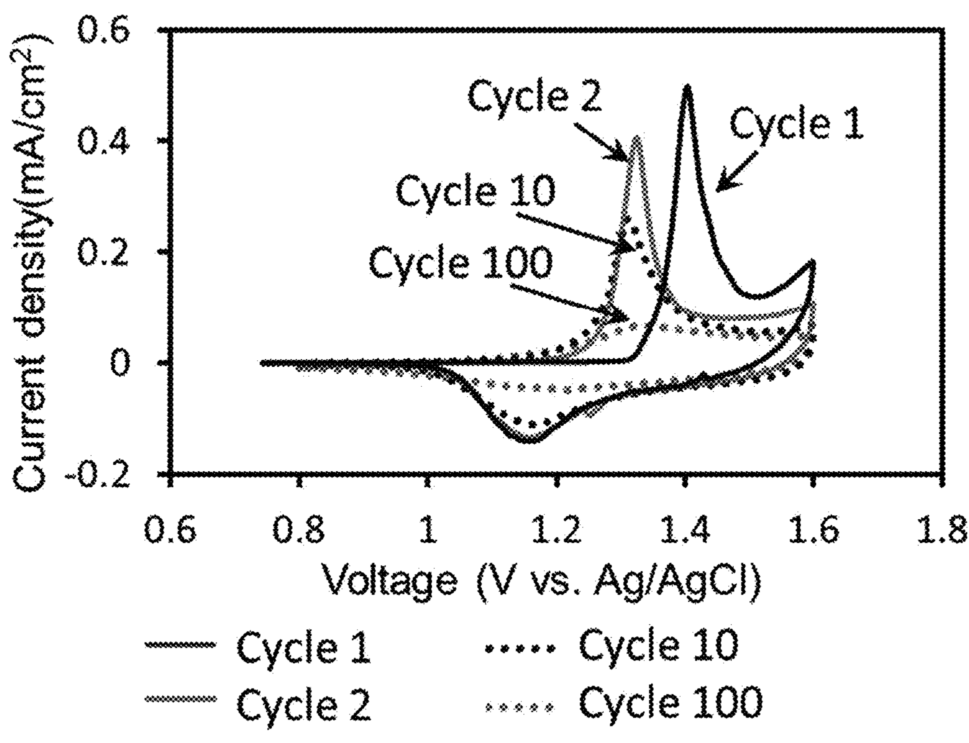
FIGS. 13(A)-(B) contain optical and electrochemical data of a three-electrode system with a polyfluorene layer before (solid lines) and after (dash lines) 100 cycles.
Figure 13B:
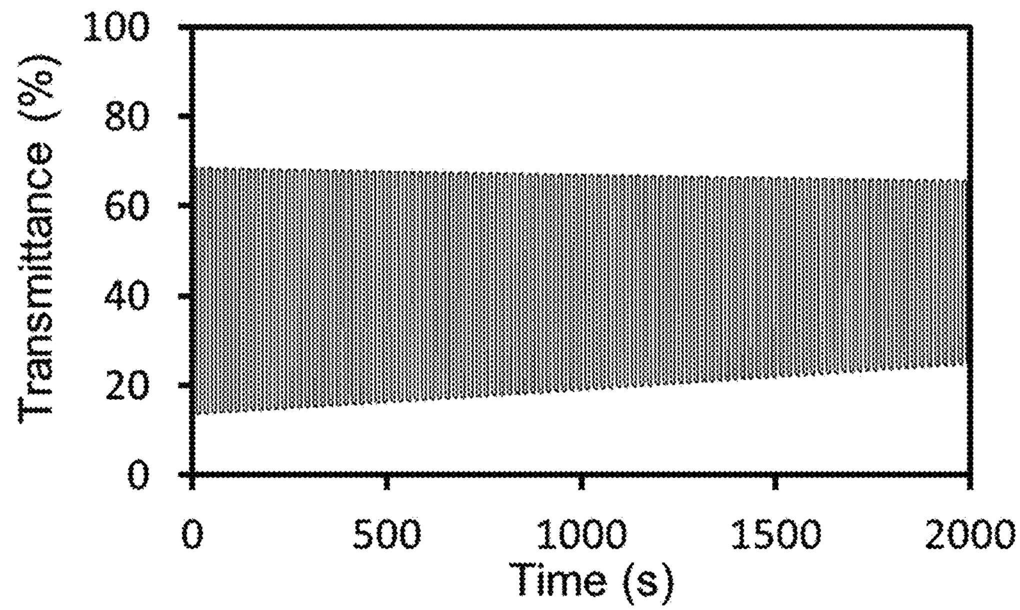

In some embodiments, a three-electrode system with an electrochromic layer comprising polyfluorene is constructed. Polyfluorene is a commonly used emission-based conjugated polymer, but well-known to be electrochemically unstable. By the same strategy as disclosed herein, a stable electrochromic device comprising an electrochromic layer having a polyfluorene structure is constructed. The electrochromic layer in configured to work under an $\eta_{eff}$ of less than 1V. The disclosed electrochromic device maintains at least 50% optical contrast after more than 100 cycles. In some embodiments, the electrochromic device comprises an electrochromic layer with a polyfluorene structure. The electrochromic layer in configured to work under an $\eta_{eff}$ of 0.7V. The electrochromic device maintains more than 70% optical contrast after 100 cycles in a three-electrode system. In one embodiment, a three-electrode system is configured with polyfluorene layer as the working electrode with 1M of $LiPF_6$ in PC as the electrolyte, Pt as the counter electrode and Ag/AgCl as the reference electrode. FIGS. 13(A)-(B) show the electrochemical and optical performance of the example three-electrode system. The polyfluorene layer in configured to work under an $\eta_{eff}$ of 0.7 V. By switching between 1.6V and 0.8V, the transmittance at 390 nm changes. The optical contrast of the polyfluorene layer at 390 nm changed from ~53% to ~41% after 100 full-contrast cycles.

In another aspect, a method for improving the cycling stability of an electrochromic device is provided. And the method comprises minimizing the $\eta_{eff}$ of the electrochromic layer in the electrochromic device. The factors to control the $\eta_{eff}$ include an electrolyte material, an electrolyte concentration, and a device temperature.

Figure 14:
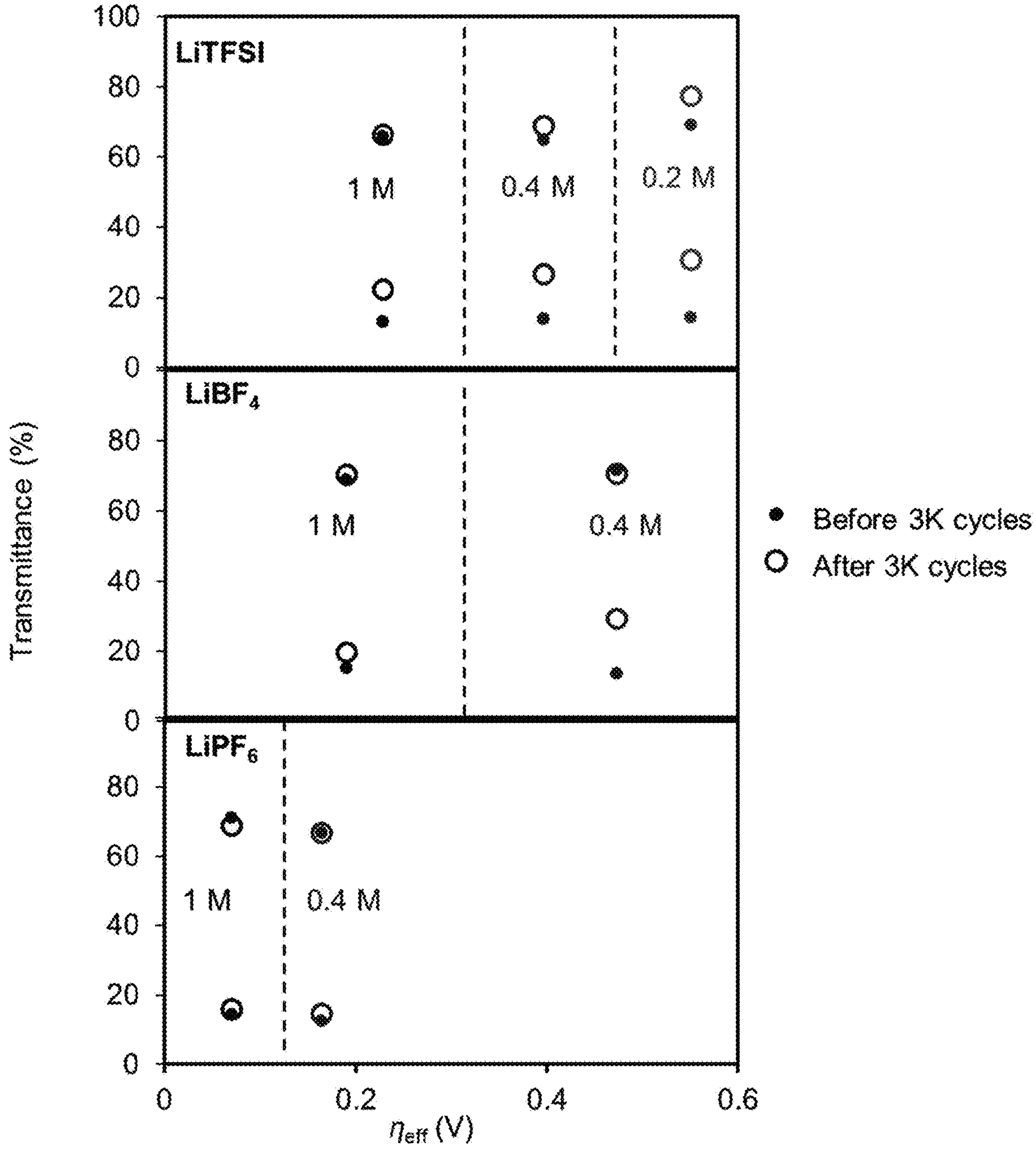
FIG. 14 is a diagram showing the transmittance changes at 445 nm after 3K full-contrast cycles at different $\eta_{eff}$ under different electrolyte conditions for a three-electrode system with an ECP-yellow thin film.

To improve the cycling stability of an electrochromic device, an electrolyte material may be selected. Due to different conductivities and ion sizes, different electrolyte salt materials can lead to different open circuit potentials. As shown in FIG. 14, the relationship between cycling stability and $\eta_{eff}$ under different electrolyte conditions is demonstrated. The colored and bleached transmittance values in the initial state are represented by solid dots, and those after 3K full-contrast switching cycles are represented by open circles. Smaller $LiPF_6$ and $LiBF_4$ lead to lower $\eta_{eff}$ than larger LiTFSI does and yield relatively constant transmittance after 3K switching cycles. Although $LiPF_6$ is larger in size than $LiBF_4$, its better conductivity leads to a lower $\eta_{eff}$ when used at the same electrolyte concentration. In some embodiments, $LiPF_6$ in PC is used to achieve an improved cycling stability for the disclosed ECD.

To improve the cycling stability of an electrochromic device, an electrolyte concentration may be selected. Typically, a higher electrolyte concentration will lead to a lower $\eta_{eff}$ and a better cycling stability, as shown for each electrolyte in FIG. 14. At a lower concentration of LiTFSI (e.g., 0.2M) or $LiBF_4$ (e.g., 0.4M), $\eta_{eff}$ is relatively higher, transmittances at a colored state and a bleached state both shift to greater values, while the shift in a bleached state is smaller than that in a colored state, leading to a decreased optical contrast, indicating a worse cycling stability. However, in carbonate electrolyte systems, a concentrated electrolyte may experience various problems, including salt precipitation, generation of HF at ambient conditions, and changes in solvation configuration and ion-ion interactions, the electrolyte concentration used in the device need to guarantee the presence of free electrolyte ions. In some embodiments, 0.4M-1M $LiPF_6$ in PC, or 0.6M-1M $LiBF_4$ in PC, or 0.8M-1M LiTFSI in PC is used as electrolyte to achieve improved cycling stability for the disclosed ECD.

To improve the cycling stability of an electrochromic device, a device temperature may be selected. Within the temperature range in which each of the components of ECD is chemically and electrochemically stable, a higher temperature (i.e., above room temperature), such as 40-80° C. or up to 100° C. as long as the device can be operated safely will lead to a lower $\eta_{eff}$ and better cycling stability.

What is claimed is:

1. An electrochromic device, comprising an electrochromic layer, wherein:

the electrochromic layer comprises an electrochromic polymer having an absorbance peak within 350-500 nm or having a maximal absorbance within 350-500 nm that is at least 50% of a maximal absorbance within 400-750 nm; and the electrochromic layer is configured to work under an effective overpotential of less than 1V, wherein the effective overpotential is $\eta_{eff}=E_{ox}-E_{oc}$, where $E_{ox}$ is an oxidation onset potential and $E_{oc}$ is an open circuit potential; such that the electrochromic device maintains more than 95% optical contrast after more than 500 cycles.

2. The electrochromic device in claim 1, wherein electrochromic polymer is a high-energy absorbing electrochromic polymer comprising a propylenedioxythiophene structure.

3. The electrochromic device in claim 2, wherein the electrochromic layer is configured to work under an effective overpotential of less than 0.3V such that the electrochromic device maintains more than 95% optical contrast after more than 1000 cycles.

4. The electrochromic device in claim 1, wherein the electrochromic layer displays one of yellow, orange, cyan, green, or black color or a combination thereof.

5. The electrochromic device in claim 1, wherein when the electrochromic layer comprises an electrochromic polymer with a yellow color, and the electrochromic layer is configured to work under an effective overpotential of less than 0.3V, the electrochromic device maintains more than 95% optical contrast after more than 3000 cycles.

6. The electrochromic device in claim 1, wherein when the electrochromic layer comprises an electrochromic polymer with an orange color, and the electrochromic layer is configured to work under an effective overpotential of less than 0.2V, the electrochromic device maintains more than 95% optical contrast after more than 3000 cycles.

7. An electrochromic device, comprising an electrochromic layer, wherein:

the electrochromic layer comprises an electrochromic polymer having a polyfluorene structure; and the electrochromic layer is configured to work under an effective overpotential of less than 1V such that the electrochromic device maintains at least 50% optical contrast after more than 100 cycles, wherein the effective overpotential is $\eta_{eff}=E_{ox}-E_{oc}$, where $E_{ox}$ is an oxidation onset potential and $E_{oc}$ is an open circuit potential.

8. A method for improving cycling stability of an electrochromic device that comprises an electrochromic layer, the method comprises limiting an effective overpotential for the electrochromic layer to work under 1V, wherein the effective overpotential is $\eta_{eff}=E_{ox}-E_{oc}$, where $E_{ox}$ is an oxidation onset potential and $E_{oc}$ is an open circuit potential.

9. The method of claim 8, wherein factors to limiting the effective overpotential include an electrolyte material, an electrolyte concentration, and a device temperature of the electrochromic device.

* * * * *